(12) United States Patent
Madhav et al.

(10) Patent No.: US 10,686,761 B2
(45) Date of Patent: *Jun. 16, 2020

(54) METHODS AND APPARATUS FOR PROVIDING A SECURE OVERLAY NETWORK BETWEEN CLOUDS

(71) Applicant: ViaSat, Inc, Carlsbad, CA (US)

(72) Inventors: Praveen Madhav, Carlsbad, CA (US); Pawan Uberoy, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,062

(22) Filed: Nov. 9, 2018

(65) Prior Publication Data

US 2019/0109826 A1  Apr. 11, 2019

Related U.S. Application Data

(63) Continuation of application No. 15/427,997, filed on Feb. 8, 2017, now Pat. No. 10,154,010, which is a continuation of application No. 14/562,326, filed on Dec. 5, 2014, now Pat. No. 9,602,544.

(51) Int. Cl.
*H04L 29/06* (2006.01)
*H04L 29/08* (2006.01)
*G06F 9/455* (2018.01)

(52) U.S. Cl.
CPC ...... *H04L 63/0272* (2013.01); *G06F 9/45558* (2013.01); *H04L 63/0281* (2013.01); *H04L 63/20* (2013.01); *H04L 67/02* (2013.01); *H04L 67/10* (2013.01); *H04L 67/1097* (2013.01); *H04L 67/141* (2013.01);
(Continued)

(58) Field of Classification Search
CPC . H04L 63/20; H04L 63/0272; H04L 63/0281; H04L 67/10
See application file for complete search history.

(56) References Cited

U.S. PATENT DOCUMENTS 7,283,534 B1 * 10/2007 Kelly ................. H04L 12/4641
370/351
2010/0027552 A1 * 2/2010 Hill ........................ H04L 12/66
370/401

(Continued)

*Primary Examiner* — Chau Le
(74) *Attorney, Agent, or Firm* — JW Law Group; James M. Wu

(57) ABSTRACT

A process capable of automatically establishing a secure overlay network ("SON") across different clouds is disclosed. The process, in one aspect, receives a first request from a first node in a first cloud for establishing a SON. After receiving a second request for connecting to the SON from a second node in a second cloud, a first connection is established connecting between the first node and the second node utilizing a network security protocol such as Internet Protocol Security ("IPSec"). After receiving a third request for connecting to the SON from a third node in a third cloud, a second connection is used to connect between the first node and the third node. A third connection is used to connect between the second node and the third node. Each subsequent request for connecting to the SON from a new node results in new connections between the new node and each existing node in the SON forming a full-mesh.

20 Claims, 7 Drawing Sheets

(52) U.S. Cl.
CPC .............. *G06F 2009/45579* (2013.01); *G06F 2009/45587* (2013.01); *G06F 2009/45595* (2013.01)

(56) References Cited

U.S. PATENT DOCUMENTS

| | | | | |
|---|---|---|---|---|
| 2010/0100616 | A1* | 4/2010 | Bryson | H04L 63/0272 709/223 |
| 2011/0261828 | A1* | 10/2011 | Smith | H04L 12/462 370/401 |
| 2012/0265976 | A1* | 10/2012 | Spiers | H04L 63/0218 713/2 |
| 2013/0182712 | A1* | 7/2013 | Aguayo | H04L 12/4633 370/395.53 |
| 2013/0347072 | A1* | 12/2013 | Dinha | H04L 63/0272 726/4 |
| 2014/0372533 | A1* | 12/2014 | Fu | G06F 9/5072 709/204 |
| 2015/0052517 | A1* | 2/2015 | Raghu | G06F 9/4856 718/1 |
| 2015/0280980 | A1* | 10/2015 | Bitar | H04L 41/5051 709/226 |
| 2016/0085534 | A1* | 3/2016 | D'Alessandro | G06F 8/61 717/176 |
| 2016/0164914 | A1* | 6/2016 | Madhav | H04L 63/20 726/1 |

* cited by examiner

METHODS AND APPARATUS FOR PROVIDING A SECURE OVERLAY NETWORK BETWEEN CLOUDS

PRIORITY

This application is a continuation application of U.S. patent application Ser. No. 15/427,997, filed on Feb. 8, 2017 in the name of the same inventor and entitled "Methods and Apparatus for Providing a Secure Overlay Network between Clouds," which is now U.S. Pat. No. 10,154,010 issued Dec. 11, 2018, which is a continuation application of U.S. patent application Ser. No. 14/562,326, filed on Dec. 5, 2014 in the name of the same inventor and entitled "Methods and Apparatus for Providing a Secure Overlay Network between Clouds," which is now U.S. Pat. No. 9,602,544 issued Mar. 21, 2017, the disclosures of which are incorporated herein by reference.

FIELD

The exemplary embodiment(s) of the present invention relates to communication networks. More specifically, the disclosed embodiment(s) of the present application relates to communication between clouds.

BACKGROUND

In today's modern computing world, more and more components are being virtualized to save capital expenditure for various entities, such as companies, public institutions, government agencies, individuals, and the like. To further reduce expenditure and conserve resources, entities are gradually allowing third party providers to maintain cloud infrastructure for hosting subscribers' virtual as well as physical components. A cloud or cloud provider, also known as cloud computing or a cluster of servers, becomes viable when entities need to increase their computing capacity or new features without investing in substantial amount of new infrastructure, personnel, hardware and/or software. It should be noted that typical third party or public cloud infrastructure providers includes, but not limited to, Amazon™, Google™, RackSpace™, and the like. For example, a cloud provider supplies cloud computing which can be subscription-based or pay-per-use service accessible over the Internet.

While some components or devices can be virtualized, others are still physical machines with hardware components placed in the vicinity of premise(s), such as laboratories, testing sites, demo sites, manufacturing facilities, and so forth. However, a problem associated with devices and/or components situated in various clouds is that a seamless communication between such components located in different clouds is difficult to achieve. A conventional approach to resolve this problem typically requires cumbersome information technology ("IT") steps requiring skilled IT administrator(s) to setup each direct connection. For example, the steps may require a skilled IT person to setup communication between devices located in different cloud locations. The manual steps may involve in opening firewalls for certain private clouds and additional scripts may be needed to setup certain connections or links.

SUMMARY

A secure overlay network ("SON"), in one embodiment, can be automatically established to enhance device communication between different clouds located in different locations. For example, a process able to create an overlay network receives a first request from a dashboard managed by an orchestrator for establishing a SON. SON is capable of facilitating a point-to-point connection between nodes residing in different clouds. A node can be a cluster of network devices or components, such as routers, hosts, switches, servers, database, and the like. After receiving a second request for connecting to the SON from a second node of a second cloud, a first connection is established between the first node and the second node using network security protocol such as Internet Protocol Security ("IPSec"). After receiving a third request for connecting to the SON from a third node in a third cloud, a second connection is established to connect the first node to the third node. A third connection is created to connect the second node to the third node.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
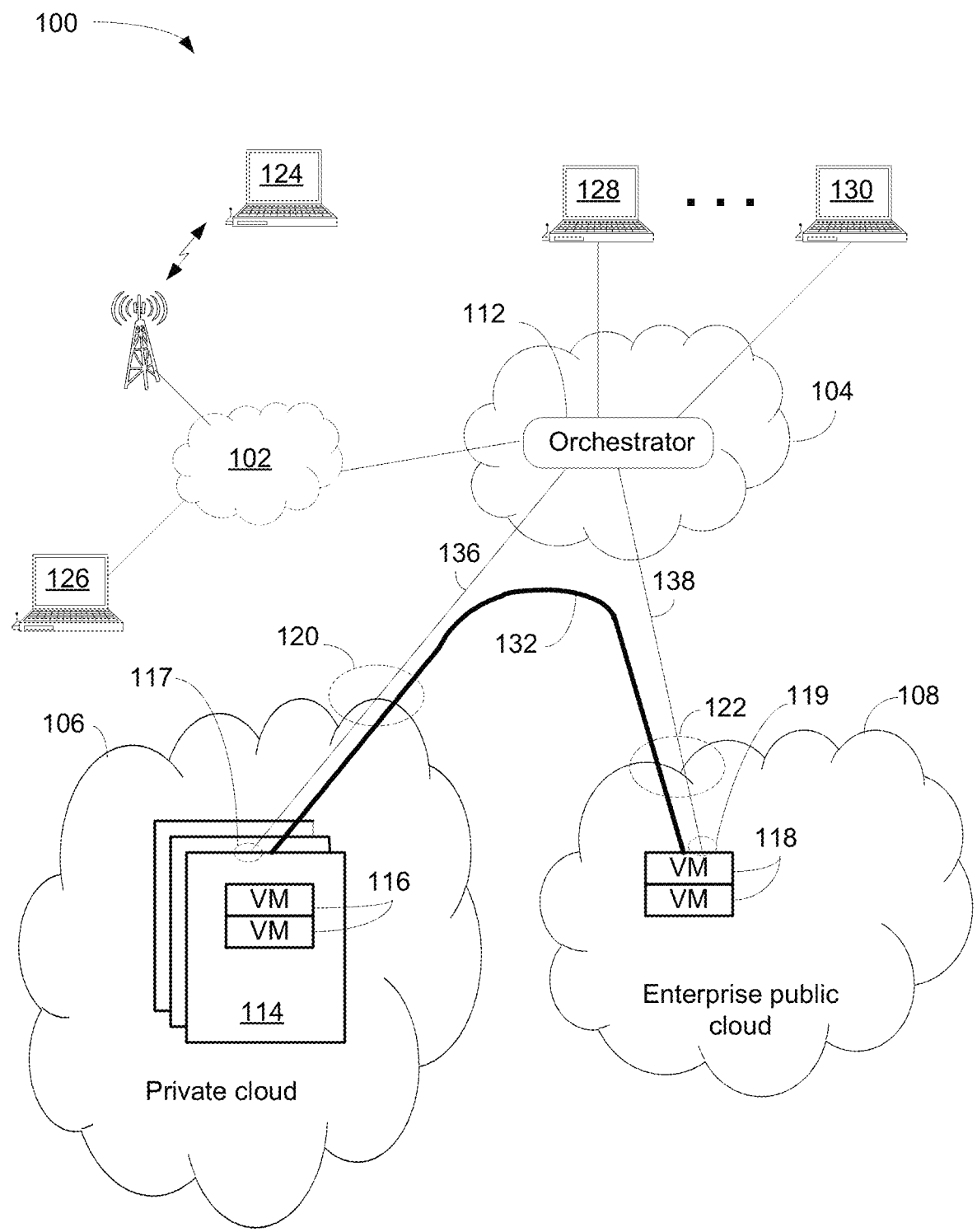
FIG. 1 is a block diagram illustrating a network having an orchestrator able to manage and launch a secure overlay network ("SON") between clouds in accordance with one embodiment of the present invention.

Exemplary embodiment(s) of the present invention is described herein in the context of a method, device, and apparatus for establishing and managing a secure overlay network ("SON") over a virtual network ("VN") containing multiple clouds.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present application discloses a mechanism creating a SON to provide point-to-point connections between various nodes or hosts situated in different clouds. The mechanism or process, in one aspect, is able to receive a first request from a dashboard requesting a SON. Note that the SON is capable of facilitating a point-to-point connection between nodes residing in different clouds. A node can be a cluster of network devices or components, such as routers, hosts, switches, servers, database, and the like.

After receiving a second request for connecting to the SON from a second node of a second cloud, a first connection is established between the first node in first cloud and the second node in second cloud using network security protocol such as IPSec. After receiving a third request to connect to the SON from a third node in a third cloud, a second connection is created to connect the first node in first cloud to the third node in third cloud. Similarly, a third connection is built to connect the second node in second cloud to the third node in third cloud. It should be noted that the connections could be logical point-to-point connections.

FIG. 1 is a block diagram 100 illustrating a network having an orchestrator able to manage and launch a SON between clouds in accordance with one embodiment of the present invention. Diagram 100 includes network or clouds 102-104, private cloud 106, and public cloud 108. Note that the terms "network" and "cloud" can be used interchangeably to indicate a group of hardware and/or software devices connected with each other to perform a networking function(s). Cloud 104, which can be either a private cloud or public cloud, contains or hosts orchestrator 112. Orchestrator 112, in one aspect, is coupled to various users 124-130 via one or more clouds and/or networks such as cloud 102. It should be noted that the underlying concept of the exemplary embodiment(s) of the present invention would not change if one or more blocks (or devices) were added to or removed from diagram 100.

A cloud is cloud computing which includes a cluster of servers residing in the cloud. The servers in the cloud are able to support or host multiple virtual machines ("VMs") running simultaneously. Cloud computing basically uses various resources including hardware, firmware, and software to deliver computing service. A benefit of using a cloud is that it shares resources with other users so that resources can be used more efficiently. Another benefit of using a cloud is that it is able to dynamically reallocate resources on demand.

A cloud can be a private cloud, a public cloud, or a hybrid cloud. A private cloud such as cloud 106 is operated for a purpose of an individual corporation, organization, and/or entity. The private cloud, in one example, can provide cloud-computing services over a network. Note that a private cloud can be managed or hosted internally, externally, or both. Cloud 106, for example, includes a set of servers 114 capable of virtualizing various assigned operations using a group of VMs 116.

A public cloud such as enterprise public cloud 108 that is open to the public providing computing services over a communication network. A public cloud, which is also known as community cloud, can be free or based on a fee schedule in exchange of clouding service. For example, exemplary public cloud service providers can be Amazon web services (AWS)™, Microsoft™, Apple™, and/or Google™ and are able to host services across the Internet. Enterprise public cloud 108, in one example, includes an array of servers capable of hosting and supporting a set of VMs 118 running simultaneously.

Hybrid cloud, in one example, is a combination of multiple clouds including private and public clouds. In an alternative example, a hybrid cloud includes VMs as well as physical machines in one or more clouds. Hybrid cloud is able to host or support a set of VMs as well as physical machines operating simultaneously.

One advantage of using a cloud operating multiple VMs instead of hardware is that some or a portion of traditional dedicated hardware devices such as routers and switches may not be required to build a network. Alternatively, a cloud can also combine VMs with existing hardware devices to optimize the performance of VN.

Orchestrator 112, in one aspect, arranges, coordinates, and manages one or more VNs based on users' requests. In addition to virtualization, orchestrator 112 is able to provide other network related functions, such as provisioning, workflows, flexible resource allocation, billing, metering, accounting, policies, and user interfaces. To improve network performance, orchestrator 112, in one embodiment, is able to scale up or scale down based on demand based on the performance of VN. The terms "orchestrator," "network orchestrator," and "orchestrator of network," mean the same apparatus and they can be used interchangeably.

A VM is a software implementation of a particular computer system that processes tasks like a real physical machine. For instance, VM can be configured to execute instructions in a way that follows the emulated computer architecture. A server or a cluster of servers containing specialized hardware and software may be used to provide a VM environment that allows multiple VMs to be operated simultaneously. VM includes system virtual machines and process virtual machines. The system virtual machine includes a set of functions operating based on an operating system. The process virtual machine is able to execute a program based on platform-independent program execution environment. Instance means a VM configured to execute program based on the emulation of a real machine or apparatus.

Private cloud or private network cloud 106 provides network services to a group of remote users across a network. In one aspect, private network cloud 106 is configured to contain a group of servers 114 capable of supporting multiple VMs 116 running at the same or substantially the same time. To communicate with orchestrator 112, private cloud 106 uses at least one Engreen™ host manager ("ehm") 117 which can be placed in one of servers 114 to communicate with orchestrator 112.

Public network cloud or enterprise public cloud 108, which is coupled to private network cloud 106 via orchestrator 112, is configured to provide cloud-computing service to remote users based on applications. Based on a requested or desired or constructed VN, a public network cloud 108 may be selected or chosen to host the requested VN. The requested VN is subsequently launched in public network cloud 108. Public network cloud 108 is able to host and execute VN(s) using various VMs 118 based on the input from user, orchestrator, or both. To communicate with orchestrator 112, public network cloud 108 uses a cloud application-programming interface ("API") 122 to facilitate communication between orchestrator 112 and public cloud 108. A cloud API or APIs, in one example, facilitate establishing VNs.

Orchestrator 112, in one embodiment, communicates with users 128-130 coupled to orchestrator 112 directly via cloud 104 and users 124-126 coupled to orchestrator 112 via a cloud 102. Some users such as user 124 are connected to orchestrator 112 via a wireless network. Orchestrator 112 is able to manage VMs 116-118 located in clouds 106-108 in response to input from remote users such as user 124 or user 130.

Orchestrator 112, in one embodiment, includes multiple dashboards, not shown in FIG. 1, wherein the dashboards are used to communicate with subscribers or users 124-130 via one or more networks. For example, orchestrator 112 is able to post a set of icons on the dashboards to facilitate user input. The icons, in one embodiment, are templates representing virtual components and/or real network devices. With input from one or more subscribers or users 124-130, orchestrator 112 is able to assist a subscriber to establish a VN based on selected templates via dashboard(s). It should be noted that additional private clouds and/or public clouds may be added in diagram 100. For example, multiple clouds containing different sets of VMs and physical machines may be selected by orchestrator to launch a selected VN. One advantage of using an orchestrator to manage VNs is that the orchestrator may allow a predefined group of subscribes to clone an established VN.

To facilitate point-to-point connections between components situated in different clouds, a SON such as SON 132 can be established. SON 132, in one embodiment, is an overlay network capable to provide direct connection between server 114 in cloud 106 and VM 118 in cloud 108. In one aspect, SON 132 is created based on a network security protocol such as IPSec overlaying an existing Internet link. For example, SON 132 is established over the existing network between links 136-138 and cloud 104. A function of SON 132 is to cause two connected end devices as they are logically direct-connected.

An overlay network can be considered as a communication network or a computer network that is established on the top of another network. Nodes in the overlay network are considered as being connected by virtual or logical links. Each virtual or logic link may correspond to a path that may travel through multiple physical connections through the physical or underlying network. In one embodiment, a SON is based on the overlay network that resides on top of another existing network such as the Internet.

A virtual appliance is a predefined VM and is able to run on a virtual machine monitor or platform such as a hypervisor. A hypervisor is a combination of computer software, firmware or hardware that is able to host and run VMs. For example, a virtual appliance allows a user to run virtual applications without installation and/or configuration of the virtual machine platform. An advantage of sharing a template of VN is that it allows a group of users to work on a similar network for the same as well as different tasks.

To create a seamless SON, a user can select a SON icon on a dashboard managed by orchestrator 112. The SON icon provides an option to a user before a VN is instantiated via the virtual network management ("VNM") framework. Once SON 132 is created, servers that have been added to the service as compute nodes can be added to SON 132. After the initial setup, SON 132 is available for selection as a communications channel between clouds. When SON connects to two or more network components, orchestrator 112 automatically sets up the secure overlay network such that the network instances can communicate with each other as if they are directly connected. It should be noted that SON is applicable between public and private clouds 106-108, public and public clouds (e.g., Amazon & Rackspace), or private and private clouds (e.g., two (2) different corporate datacenters located in different locations).

An advantage of using SON is that orchestrator allows users to launch a SON for facilitating communication between clouds without intervention from administrator, firewall changes, manual configuration, and the like. It should be noted that automation of SON launch conserves resources such as manual operation and human interaction whereby the SON enhances overall network performance.

Figure 2:
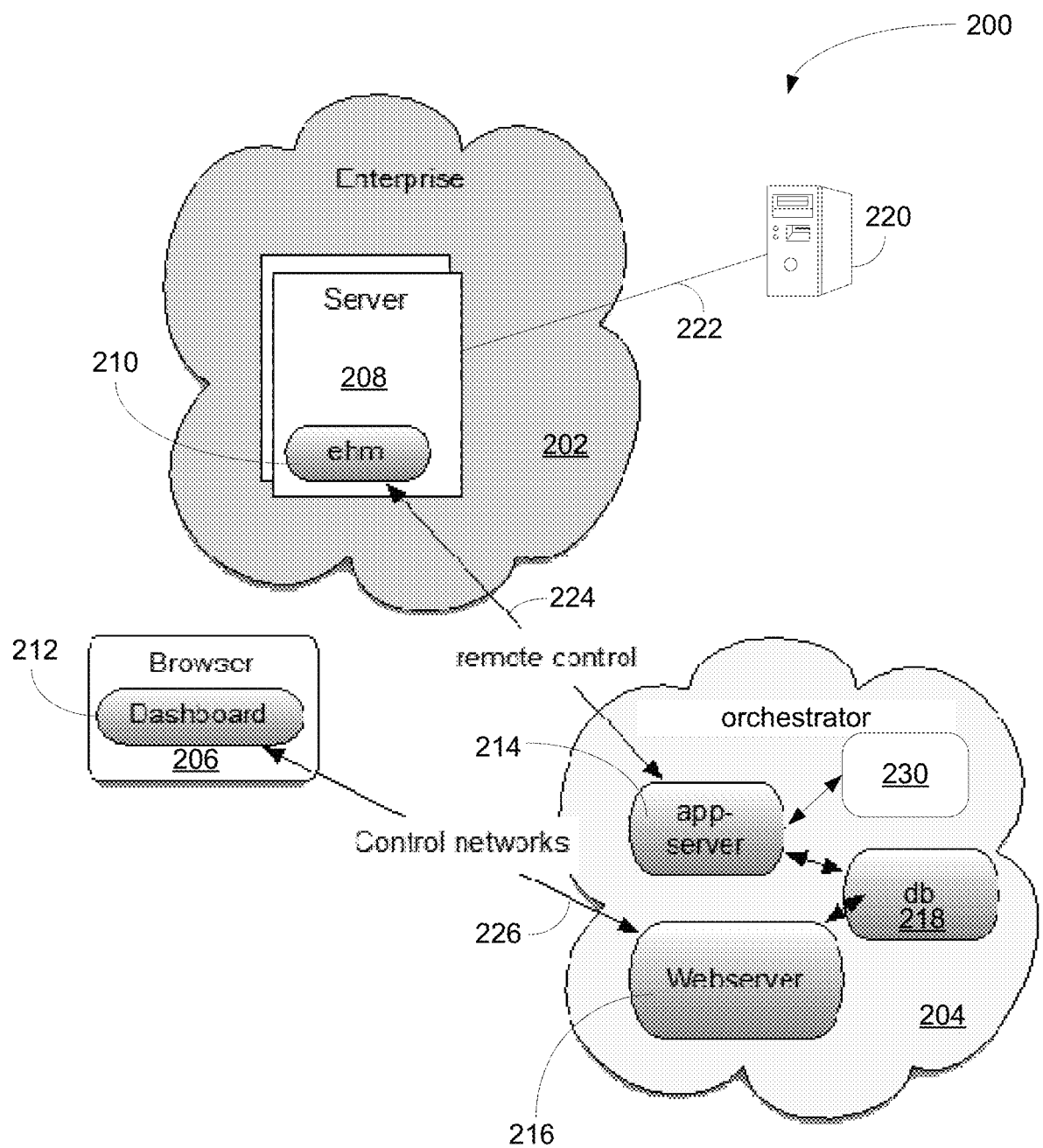
FIG. 2 is a block diagram illustrating an exemplary orchestrator having a dashboard capable of managing a SON in accordance with one embodiment of the present invention.

FIG. 2 is a block diagram illustrating an exemplary orchestrator having a dashboard capable of managing SON in accordance with one embodiment of the present invention. Diagram 200 shows a network including an enterprise private cloud 202, orchestrator 204, and dashboard 212. Dashboard 212, in one aspect, resides online which can be accessed via a browser 206. A physical machine such as system 220, in one example, can be coupled to cloud 202 as part of cloud 202. It should be noted that the underlying concept of the exemplary embodiment(s) of the present invention would not change if one or more blocks (or devices) were added to or removed from diagram 200.

Orchestrator 204, in one embodiment, includes an application server 214, web server 216, database 218, and SON manager 230. Orchestrator 204 may be hosted by a private, public, micro, or hybrid cloud. In one example, orchestrator 204 can be hosted by cloud 202. Alternatively, another private or public cloud may be used to host orchestrator 204. Application server 214 is used to communicate with enterprise cloud 202 via network connection 224. Connection 224 can be a wired, wireless, or a combination of wired and wireless network connection. A function of application server 214 is to remotely control or manage VN(s) and/or SON(s) running at cloud 202 via ehm 210. Ehm 210, which may be residing in one or multiple servers 208, is able to report VN status to application server 214 and receives instruction(s) from application server 214.

Web server 216, in one embodiment, is used to communicate with user(s) or subscriber(s) via dashboard(s) 212. In one aspect, Web server 216 is capable of selectively posting icons or templates on dashboard(s) via a wired or wireless connection 226. When a user or subscriber logs into orchestrator 204 via a web browser such as browser 206, dashboard 212 will display various predefined icon images including a SON option. A function of dashboard 212 is that it allows a subscriber to pick and choose virtual devices represented by the icons to build a unique or application specific VN. Alternatively, dashboard 212 may also offer an opportunity for a user or subscriber to clone an existing VN.

SON manager 230, which can be hardware, software, firmware, or a combination of hardware, software, and firmware, is configured to facilitate launching and maintaining an overlay network for network communication. For example, SON manager 230 may include a SON table, not shown in FIG. 2, wherein the table records or maps one or more overlay networks. Depending on the applications, an active SON may be created based on secure, automatic, and/or dynamically overlaying across multiple clouds via an existing communication network. Clouds, for instance, can be located at different geographical locations. A function of SON manager 230 is to provide a method or procedure to dynamically create and manage one or more SONs over one or more existing networks across several clouds.

Orchestrator 204, which can also be referred to as network orchestrator, network manager, and/or orchestrator of networks, is able to manage virtual devices as well as physical devices. Orchestrator 204 can also provide automatic scaling in response to the demand and/or execution of VN(s). An advantage of using an orchestrator is that it provides automatic convergence as well as leveraging resources in different physical locations.

Cloud 202 is similar to cloud 106, shown in FIG. 1, except that cloud 202 is coupled to physical machine 220. In one example, cloud 202 is a private cloud operated by an entity. The entity builds a unique VN to test its network device that may be installed in physical machine 220. After a provisioning process, orchestrator 204 facilitates building a requested VN that integrates physical machine 220 as a part of VN in accordance with the subscriber's request. Once a desirable SON is built or established, other components are allowed to join in the SON once such components are verified and authenticated.

An advantage of providing a SON option by dashboard 212 is that it allows other users or subscribers to automatically launch or join SON without cumbersome process and administrators' interaction.

Figure 3:
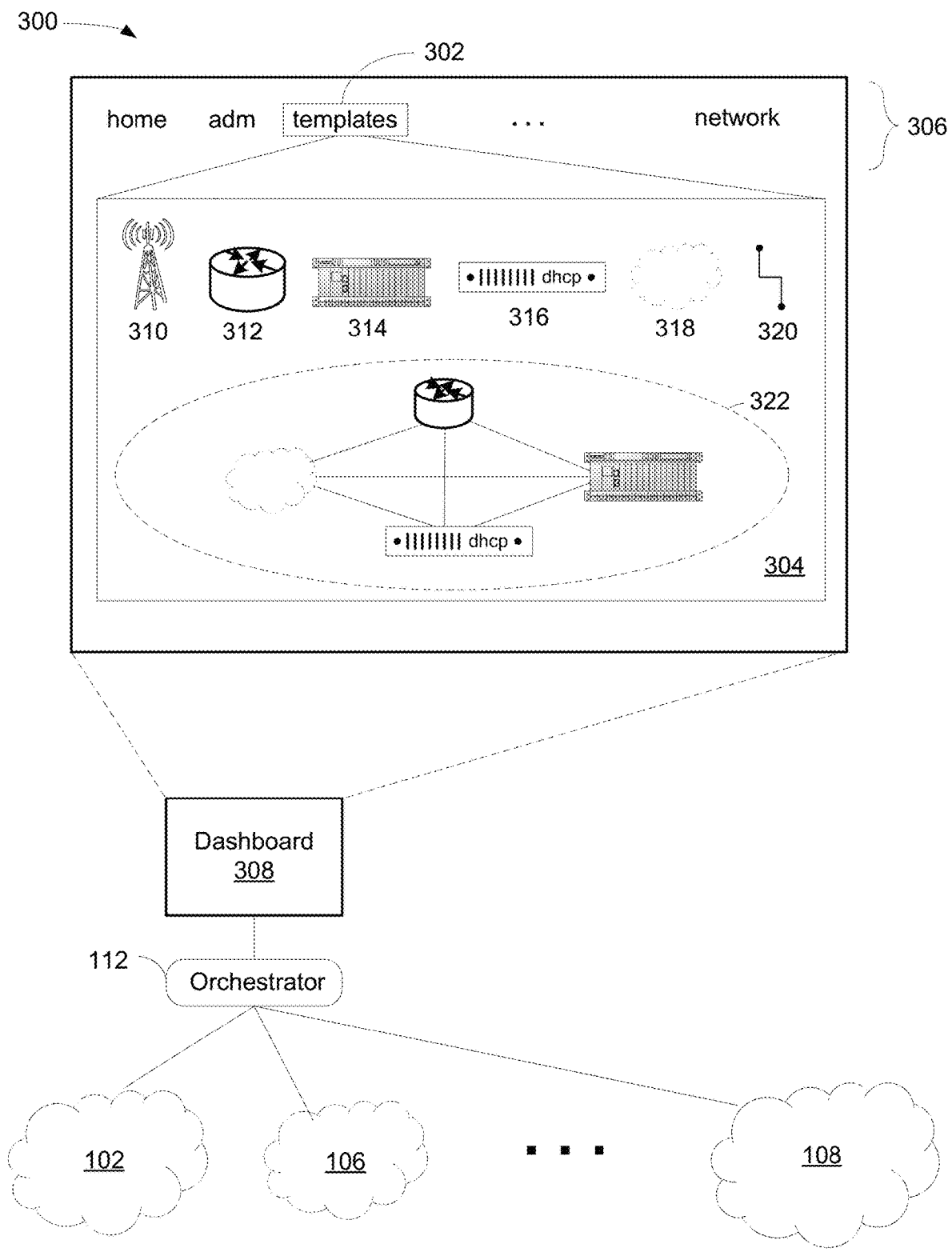
FIG. 3 is a block diagram illustrating an exemplary dashboard able to facilitate launch and manage a SON in accordance with one embodiment of the present invention.

FIG. 3 is a block diagram 300 illustrating an exemplary dashboard able to facilitate launch and manage SON in accordance with one embodiment of the present invention. Diagram 300 includes clouds 102-108, orchestrator 112, and dashboard 308. Dashboard 308, in one embodiment, includes a toolbar 306, template 302, and pull-down menu 304. Toolbar 306 lists various buttons representing various functions such as home button and template 302. It should be noted that the underlying concept of the exemplary embodiment(s) of the present invention would not change if one or more blocks (or devices) were added to or removed from diagram 300.

Pull-down menu 304 illustrates multiple icons 310-322 representing various virtual or real network related devices (or components) when template 302, for example, is clicked. Menu 304 lists various icons, such as tower 310, router 312, rack 314, network device 316, cloud 318, connection 320, and/or SON option 322. SON option 322 can also be configured as a button or icon as tower 310 or router 312. A subscriber or user can selectively pick and choose any icons to build a desirable virtual network. Once a set of icons is selected, orchestrator will select one of clouds 102-108 to launch the selected VN. Depending on the applications, orchestrator 112 may scale up or down depending on the demand of computing power in accordance with the selected VN.

An advantage of providing SON option on dashboard 308 is that it allows a user to select SON option before the launch of a desirable VN.

Figure 4:
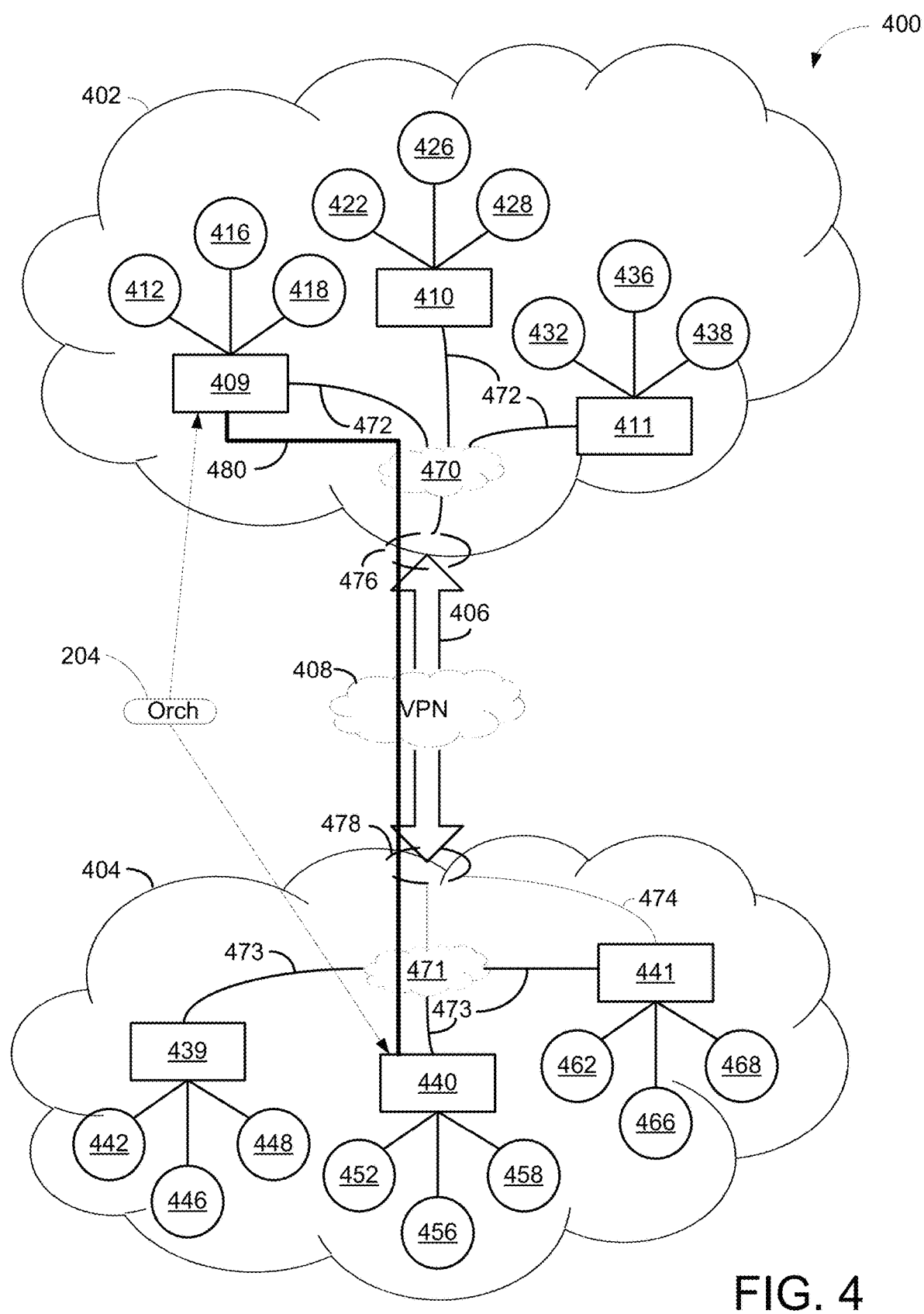
FIG. 4 is a block logic diagram illustrating exemplary clouds connected by a SON in accordance with one embodiment of the present invention.

FIG. 4 is a block diagram 400 illustrating exemplary clouds connected via a SON in accordance with one embodiment of the present invention. Diagram 400 includes orchestrator 204 and two private clouds 402-404 which are interconnected via a virtual private network ("VPN") 408. VPN 408, in one example, can be a private network, public network, or a combination of public and private network. It should be noted that the underlying concept of the exemplary embodiment(s) of the present invention would not change if one or more blocks (or devices) were added to or removed from diagram 400.

VPN 408 is capable of transporting data between clouds 402-404 using links and/or channels 406. VPN 408 may include one or more networks such as the Internet and/or wide area network ("WAN") to provide network communications. VPN, in one instance, includes proxy servers to cover and to improve network services. In one embodiment, SON 480 is established over VPN 408 providing point-to-point connection between node 409 and node 440. A node, in one example, includes server(s), VM(s), physical network device(s), or a cluster of physical devices and VMs.

Cloud 402 includes multiple functional blocks or nodes such as servers 409-411 wherein server 409 is further connected to router 412, database 416, and controller 418. Similarly, while server 410 is connected to router 422, database 426, and controller 428, server 411 is coupled to router 432, database 436, and controller 438. Alternatively, cloud 402 can be configured to include routers 409-411 wherein each router is able to launch and maintain multiple VMs. For example, router 409 maintains VM 412 as virtual server, VM 416 as virtual database, and VM 418 as virtual controller.

It should be noted that routers, databases, servers, and/or controllers can be virtual machines, physical machines, and/or a combination of virtual machines and physical machines. Cloud 402, for example, may contain additional components, such as routers, switches, hubs, servers, databases, and the like. Depending on the applications, components or devices such as routers and servers can be dynamically added or removed on demand.

Servers 409-411 are interconnected by a set of internal links 472. In one example, internal network 470 couples an edge I/O (input and output) port 476 of cloud 402 to nodes 409-411. Internal network 470, in one example, encompasses a cluster of links 472 used for connections. It should be noted that internal links 472 and network 470 could be virtual, physical, or a combination of virtual and physical connections.

Cloud 404, which is similar to cloud 402, includes multiple functional blocks or nodes such as servers 439-441 wherein server 439 is connected to router 442, database 446, and/or controller 448. Server 440 is connected to router 452, database 456, and controller 458. Server 441 is coupled to router 462, database 466, and controller 468. In an alternative embodiment, cloud 404 is configured to include servers 439-441 wherein each server is able to manage multiple VMs. For example, server 439 maintains VM 442 as virtual server, VM 446 as virtual database, and VM 418 as virtual controller.

Servers 439-441 are interconnected by a set of internal links 473. In one example, an internal network 471 is used to facilitate connections between links 473 with edge I/O port 478 of cloud 404. It should be noted that internal links 473 and network 471 can be virtual, physical, or a combination of virtual and physical connections.

In one embodiment, the communication network illustrated by diagram 400 shows a SON 480 configured to provide point-to-point connection between node 409 and node 440. While nodes 409-411 reside in cloud 402 and nodes 439-441 reside in cloud 404, SON 480 is established over existing VPN 408. In one aspect, orchestrator 204 is used to control and maintain SON 480.

Orchestrator 204, which is coupled to clouds 402-404, is able to establish a point-to-point connection between the I/O port of a first server in cloud 402 and I/O port of a second server in cloud 404 in accordance with a network security protocol. In one embodiment, the network security protocol is IPSec that is capable of building point-to-point connections based on an existing network.

Diagram 400 may further include a third private cloud, not shown in FIG. 4, configured to provide network services to users. Orchestrator 204 is able to generate a second point-to-point connection between the I/O port of the first server in cloud 402 and an I/O port of a third server in the third private cloud. To provide a SON, orchestrator 204 is able to generate a second point-to-point connection between the second I/O port of the second server in cloud 404 and the third I/O port of the third server in the third private cloud as well as a third point-to-point connection between the first I/O port of the first server in cloud 402 and third I/O port of the third server in the third private cloud. Orchestrator 204 is able to implement SON 480 over an existing network or VPN 408 to establish point-to-point connections in accordance with IPSec.

An advantage of using SON is that SON allows a user to test a desirable network that could span across one or more cloud boundaries. For example, various virtual and physical devices located in different locations can be connected using a secure and automated overlay network. SON, in one embodiment, allows the secure and seamless communication between the devices using point-to-point (or end-to-end) connections (or links). It should be noted that an overlay network can be created automatically when the network is launched. Orchestrator 112 is also capable of tearing or terminating an existing SON when it is no longer needed.

Figure 5:
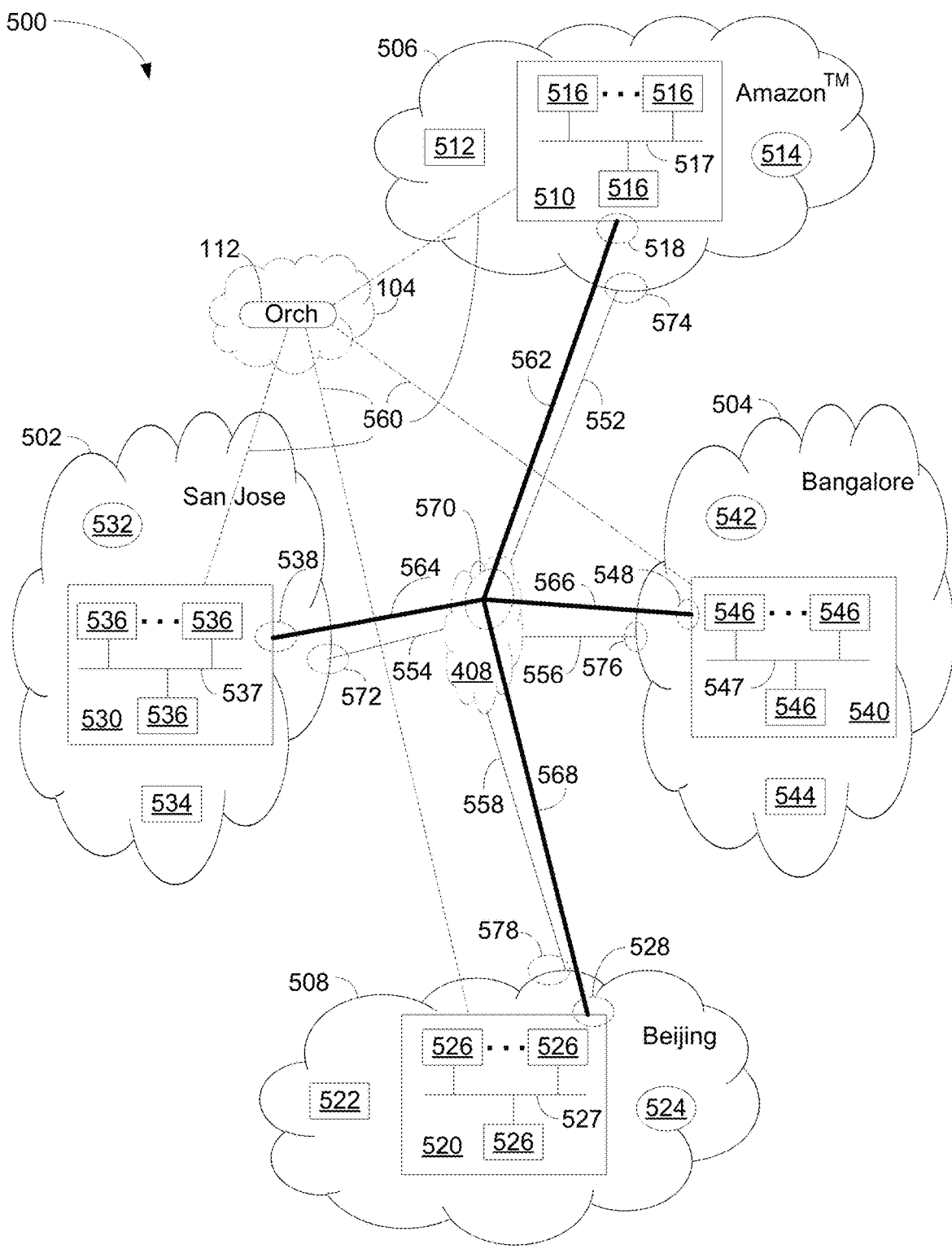
FIG. 5 is a block diagram illustrating an exemplary network configuration having multiple clouds coupled with a SON in accordance with one embodiment of the present invention.

FIG. 5 is a block diagram 500 illustrating an exemplary network configuration having multiple clouds coupled with SON in accordance with one embodiment of the present invention. Diagram 500 includes clouds 502-508, orchestrator 112, and VPN 408, wherein clouds 502-508 are situated in geographically different locations. For example, cloud 502 may be in San Jose and cloud 504 is in Bangalore. While cloud 508 is in Beijing, cloud 506 is an Amazon™ public cloud situated in Seattle. Clouds 502-508 are connected by VPN 408 via channels 552-558 through edge I/O ports 572-578. It should be noted that the underlying concept of the exemplary embodiment(s) of the present invention would not change if one or more blocks (or devices) were added to or removed from diagram 500.

Cloud 502 includes multiple nodes such as nodes or servers 530-534 wherein each node further includes one or more VMs, physical devices, and/or a combination of VM and physical device. For example, node 530, which can be a server, host, switch, hub, et cetera, includes multiple components 536 connected by a set of internal links 537. Similarly, Cloud 504 includes nodes or servers 540-544 wherein each node further includes one or more VMs, physical devices, and/or a combination of VM and physical device. For example, node 540, which can be a server, host, switch, hub, et cetera, includes multiple components 546 connected by a set of internal links 547.

Also, cloud 506 includes nodes or servers 510-514 wherein each node further includes one or more VMs, physical devices, and/or a combination of VM and physical device. For example, node 510, which can be a server, host, switch, hub, et cetera, includes multiple components 516 connected by a set of internal links 517. Similarly, Cloud 508 includes nodes 520-524 wherein each node may further includes one or more VMs, physical devices, and/or a combination of VM and physical device. For example, node 520, which can be a server, host, switch, hub, et cetera, includes multiple components 526 connected by a set of internal links 527.

A communication network or VPN 408 is used to link clouds 502-508 together via connections 552-558. Connections 552-558 are employed to link I/O ports 572-578 of clouds 502-508 for information transmission. In one embodiment, a SON is established over VPN 408 to provide point-to-point connections. For example, I/O port 538 of node 530 can be connected to I/O port 548 of node 540 using point-to-point connections 564-566 established over existing VPN 408 using SON. Similarly, I/O port 538 of node 530 can be connected to I/O port 518 of node 510 using point-to-point connections 564 and 562 established over existing VPN 408 using SON. Also, I/O port 528 of node 520 can be connected to I/O port 548 of node 540 and I/O port 538 of node 530 wherein point-to-point connections 566-568 are used to link between ports 528 and 548, and point-to-point connection 564 and 568 are used to link between ports 528 and 538 of node 530.

In one embodiment, orchestrator 112 is able to communication with nodes directly using links 560 to facilitate building a SON. A network security protocol may be used to build an overlay network over an existing network. In one embodiment, the network security protocol is IPSec. When SON is established, a full-mesh connection between selected nodes is generated.

During an exemplary operation, orchestrator 112 is able to present a dashboard via a communication network to a user or subscriber wherein the dashboard displays an option of creating a SON. A first selection requesting SON such as SON 570 is received for point-to-point connections from a first virtual server 530 in a first cloud 502 over the communication network 408. After receiving a second selection requesting SON 570 from a second virtual server 540 in a second cloud 504 over the communication network such as VPN 408, a first point-to-point connection 564-566 between first virtual server 530 and second virtual server 540 is established in accordance with SON 570 using a network security protocol such as IPSec. After receiving a third selection requesting SON 570 from a third virtual server 520 in a third cloud 508, a second point-to-point connection 566-568 between second virtual server 540 in second cloud 504 and third virtual server 520 in third cloud 508 as well as a third point-to-point connection 564-568 between first virtual server 530 in first cloud 502 and third virtual server 520 in third cloud 508 are established in accordance with SON 570.

Upon establishing SON 570 using point-to-point connections 562-568 connecting nodes 510-540, a full-mesh network is generated. An advantage using a mesh network for a SON is that each node such as node 510 is directly, at least logically, connected to other nodes such as nodes 520-540 even though the other nodes are located in different clouds. When two nodes are directly connected, the communication between the two nodes will be easier and more robust. In addition, existing networking protocols for point-to-point connection become available to nodes that are connected in the mesh network.

Figure 6:
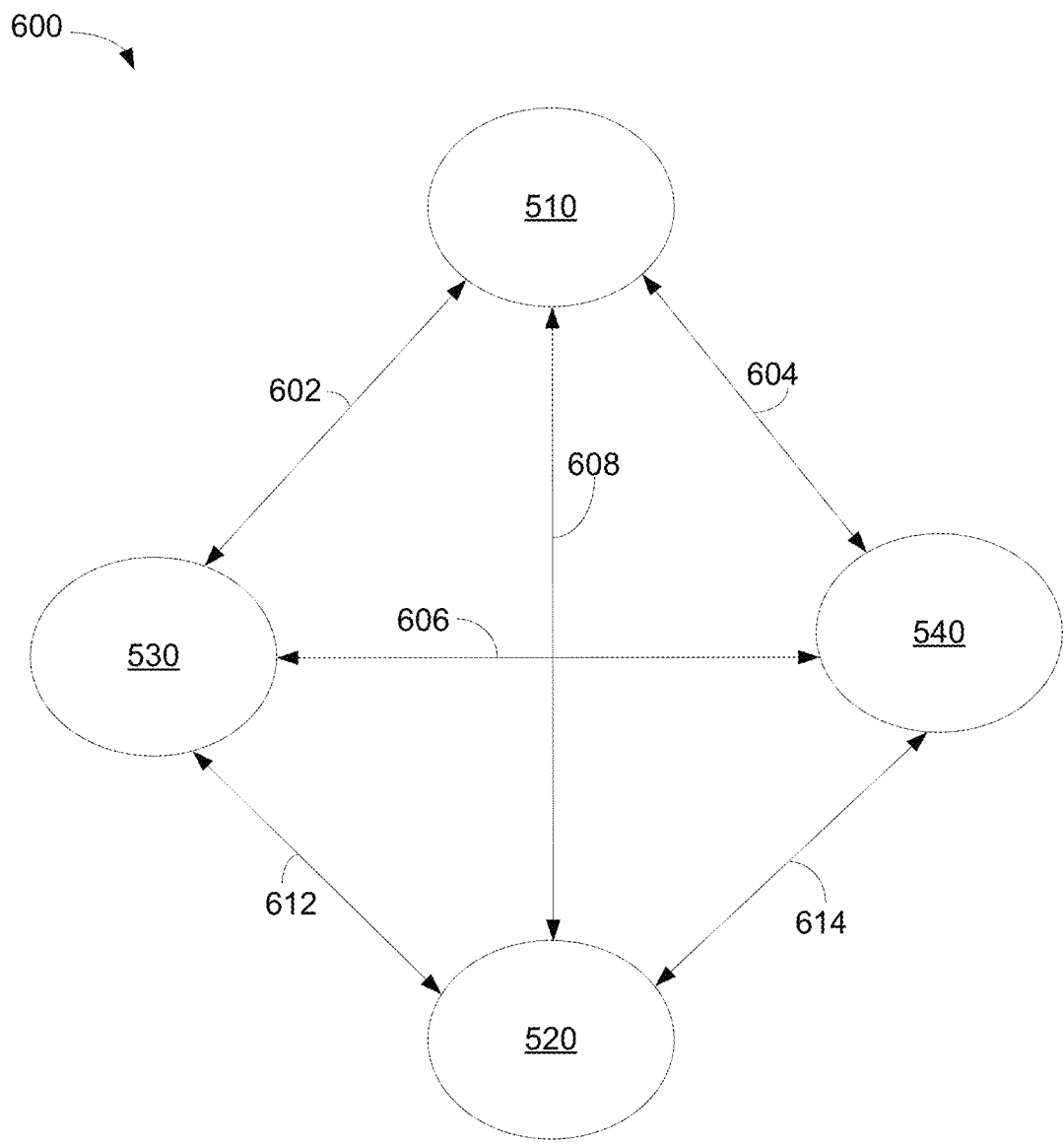
FIG. 6 is a logic block diagram illustrating an exemplary process of establishing a SON across cloud boundaries in accordance with one embodiment of the present invention.

FIG. 6 is a logic block diagram 600 illustrating an exemplary network connected by a point-to-point mesh configuration using SON in accordance with one embodiment of the present invention. Diagram 600 includes nodes 510-540 and point-to-point connections 602-614. Each node is directly connected to the rest of nodes within the SON in a full-mesh configuration. For example, node 510 is directly connected to node 530 via connection 602 and node 520 via connection 608. Also, node 510 is connected to node 540 via connection 604. Similarly, node 540 is directly connected to node 530 via connection 606 and node 520 via connection 614. Also, node 540 is connected to node 510 via connection 604. In one aspect, every node in the mesh network is directly connected to all other nodes in the network.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 7:
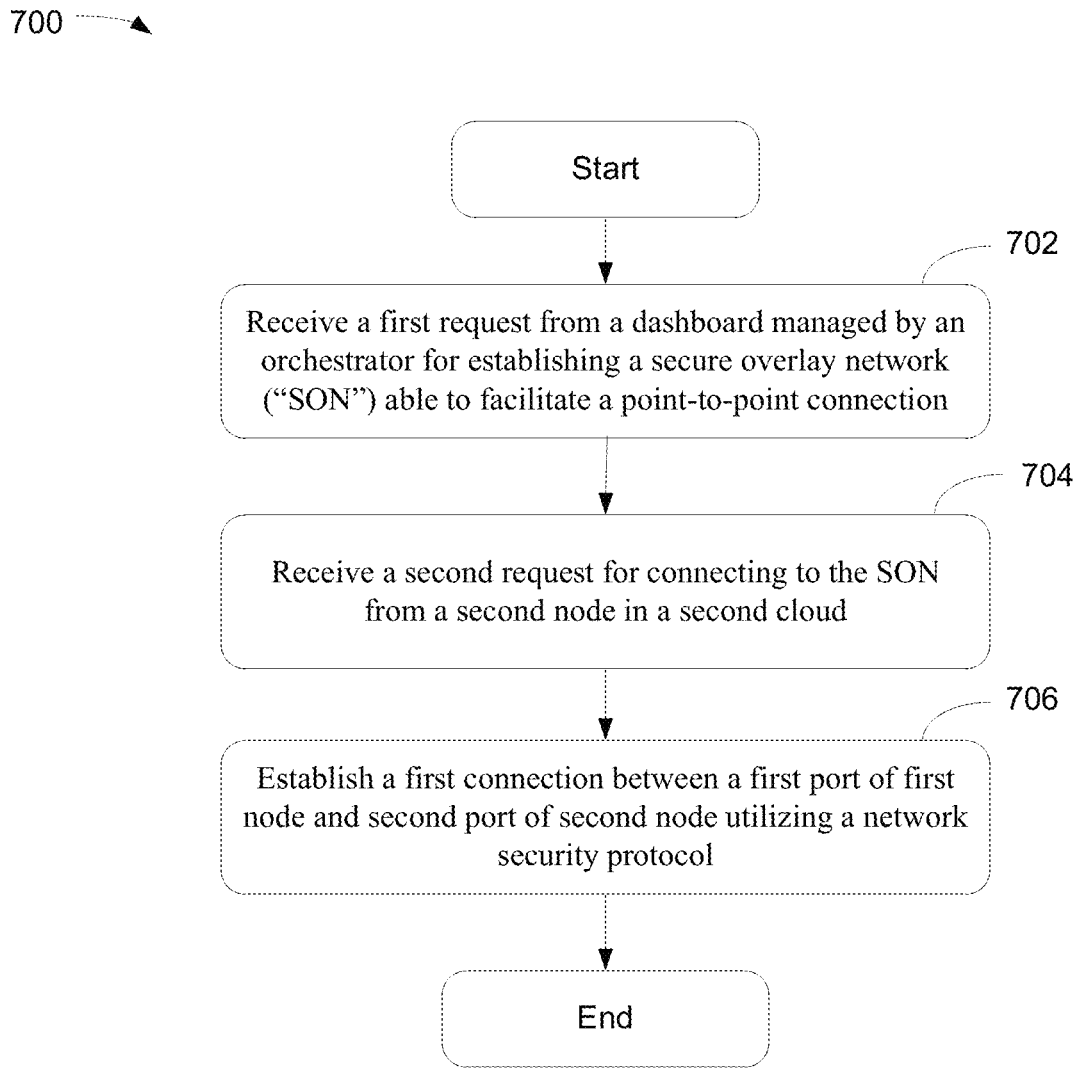
FIG. 7 is a flowchart illustrating an exemplary process of establishing a SON coupling multiple clouds together in accordance with one embodiment of the present invention.

FIG. 7 is a flowchart 700 illustrating an exemplary process of establishing SON across cloud boundaries in accordance with one embodiment of the present invention. At block 702, a process able to launch and maintain SON is capable of receiving a first request from a dashboard managed by an orchestrator for establishing SON. SON is able to facilitate a point-to-point connection from a first node in a first cloud over a communication network. In one aspect, a dashboard managed by orchestrator interacts with the user for facilitating options or user selections before launching a VM. For example, an option selected by a first user is received via a dashboard which is facilitated by the orchestrator for launching VN.

At block 704, the process is able to receive a second request for connecting to the SON from a second node in a second cloud over the communication network. In one example, a SON selection is received from a dashboard managed by the orchestrator from a second user via a node from a public cloud.

At block 706, the process establishes a first connection between a first port of the first node and the second port of the second node using a network security protocol such as IPSec. After receiving a third request for connecting to the SON from a third node in a third cloud over the communication network, a second connection is established between the first port of the first node and the third node of the third cloud. A third connection is also established or created between the second node of the second cloud and the third node of the third cloud. As more requests are received for adding a cloud to the SON, a new connection is created from the new node of the new cloud to each existing node of each existing cloud to form the full-mesh. Note that IPsec is able to build a secure packet exchange tunnel at IP layer.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing an overlay network between nodes situated in multiple clouds via an existing network comprising:

receiving a first request from a first dashboard managed by an orchestrator situated in a network for establishing a secure overlay network ("SON") between a first node in a first cloud and a second node in a second cloud over at least a portion of the existing network;

verifying a first cloud interface between the orchestrator and the first cloud, and a second cloud interface between the orchestrator and the second cloud over the existing network; and establishing a first SON between a first port of the first node in the first cloud and a second port of the second node in the second cloud via the first and second cloud interfaces through at least a portion of the existing network.

2. The method of claim 1, wherein the establishing the first SON includes facilitating a point-to-point connection from the first node in the first cloud to the second node in the second cloud via at least one pre-existing connection.

3. The method of claim 1, further comprising receiving a second request from a second dashboard managed by the orchestrator for establishing a second SON able to facilitate a point-to-point connection between a third node in a third cloud and a fourth node in a fourth cloud over an existing network.

4. The method of claim 3, further comprising verifying a third cloud interface between the orchestrator and the third cloud, and a fourth cloud interface between the orchestrator and the fourth cloud over the existing network.

5. The method of claim 4, further comprising establishing the second SON between the third node and the fourth node via the third and fourth cloud interfaces through the existing network.

6. The method of claim 1, wherein the receiving a first request from a first dashboard further includes providing a dashboard over a browser to interact with a user for facilitating a plurality of user selections before launching a virtual machine ("VM").

7. The method of claim 1, wherein receiving a first request from a first dashboard includes receiving an option selected by a first user via a dashboard facilitated for launching a virtual network.

8. The method of claim 1, wherein receiving a first request from a first dashboard includes receiving a SON selection from a user via the first node from a private cloud.

9. The method of claim 1, wherein receiving a first request from a first dashboard managed by an orchestrator situated in an orchestrator network for establishing a secure overlay network ("SON") between a first node in a first cloud and a second node in a second cloud includes receiving a SON selection from a user via a node from a public cloud.

10. The method of claim 1, wherein establishing the first SON between the first port of the first node in the first cloud and the second port of the second node in second cloud includes creating a logical link between the first port and the second port utilizing Internet Protocol Security ("IPsec") to build a secure packet exchange tunnel at IP layer.

11. The method of claim 1, wherein establishing the first SON between the first port of the first node in the first cloud and the second port of the second node in second cloud includes generating a direct connection between a port of a server in a private cloud and a port of virtual machine ("VM") in a public cloud utilizing an Internet Protocol Security ("IPSec").

12. An apparatus capable of providing an overlay network between nodes situated in different clouds via existing network communications, comprising:

a first cloud, having one or more servers coupling to an existing network, containing a plurality of internal nodes connected by a plurality of first internal connections;

a second cloud, having one or more servers coupling to the existing network, coupled to the first cloud via the existing network and configured to have a plurality of internal nodes connected by a plurality of second internal connections; and an orchestrator, having one or more processors coupling to an existing network, situated in a third cloud and coupled to the first and the second clouds via at least one pre-existing connection of the existing network, wherein the orchestrator includes a receiver configured to receive a request for a secure overlay network (SON) from a first internal node inside the first cloud to a second internal node inside the second cloud.

13. The apparatus of claim 12, wherein the orchestrator further includes a SON manager device configured to create the requested SON as an overlay network over the pre-existing network.

14. The apparatus of claim 13, wherein the SON is a point-to-point logically direct connection from the first internal node in the first cloud to the second internal node in the second cloud.

15. The apparatus of claim 14, wherein the SON manager device is further configured to create the SON in accordance with a network security protocol.

16. The apparatus of claim 15, wherein the network security protocol is IPSec.

17. The apparatus of claim 12, wherein the orchestrator is able to scale up capacity based on performance of virtual network.

18. The apparatus of claim 12, wherein the existing network is a virtual private network.

19. The apparatus of claim 12, wherein the first cloud, the second cloud, and the third cloud are located in different geographical locations.

20. A method for providing an overlay network between nodes situated in multiple clouds via existing network, comprising:

receiving a request from a dashboard managed by an orchestrator situated in a network for establishing a secure overlay network ("SON") able to facilitate a point-to-point connection between a first node in a private cloud and a second node in a public cloud via at least a portion of a pre-existing network;

verifying a private cloud interface between the orchestrator and the private cloud, and a public cloud interface between the orchestrator and the public cloud over the pre-existing network; and launching the SON between the first node and the second node via the cloud interfaces utilizing at least a portion of the pre-existing network.

* * * * *